Nov. 10, 1970           J. S. COURTNEY-PRATT           3,539,939
LASER PULSE GENERATOR USING A ROTATING PRISM ALTERNATELY
AS A REFLECTIVE AND AS A TRANSMISSIVE ELEMENT
Filed Feb. 9, 1966

INVENTOR
*J. S. COURTNEY-PRATT*
BY
*Sylvan Sherman*
ATTORNEY

United States Patent Office 3,539,939
Patented Nov. 10, 1970

3,539,939
LASER PULSE GENERATOR USING A ROTATING PRISM ALTERNATELY AS A REFLECTIVE AND AS A TRANSMISSIVE ELEMENT
Jeofry S. Courtney-Pratt, Springfield, N.J., assignor to Bell Telephone Laboratories, Incorporated, New York, N.Y., a corporation of New York
Filed Feb. 9, 1966, Ser. No. 526,304
Int. Cl. H01s 3/11
U.S. Cl. 331—94.5                                    4 Claims

ABSTRACT OF THE DISCLOSURE

High intensity optical pulses are extracted from a phase-lock laser oscillator by means of a rotating prism. Over an interval of time sufficiently long to permit laser oscillations to build up, the prism functions as one of the cavity mirrors by totally reflecting the wave energy incident upon it. However, as it continues to rotate beyond a critical angle, a substantial portion of the wave energy is momentarily transmitted through the prism. The device thus permits a relatively slow buildup of a high energy pulse within the laser, followed by its rapid extraction. The device can be operated in either a synchronous or non-synchronous mode.

---

This invention relates to high intensity optic pulse generators.

In an article entitled "Locking of He-Ne Laser Modes Induced by Synchronous Intracavity Modulation" by L. E. Hargrove, R. L. Fork and M. A. Pollack, published in the July 1, 1964 issue of Applied Physics Letters, pages 4–5, there is described an arrangement for stabilizing the amplitudes and the frequencies of the modes in laser oscillators. A result of this mode "locking" technique is to produce a high intensity pulse, or packet, of optic wave enrgy which travels back and forth within the laser cavity. Typically, the intensity of this pulse of energy is of the order of one hundred times greater than the intensity of pulses emitted from such a laser through one of the partially transmitting end reflectors. Recognizing that a high intensity, highly monochromatic pulse of optic energy may be valuable for many purposes, such as high speed photography, it is the broad object of this invention to extract high intensity pulses from a mode-locked laser.

In accordance with the present invention, high intensity pulses are extracted from within a synchronously modulated laser by means of a rotating prism which functions alternately as one of the cavity end reflectors, and as a partially transmissive member. Over an interval of time sufficiently long to permit laser oscillations to build up, the prism functions as one of the cavity mirrors by totally reflecting the wave energy incident upon it. However, as the prism continues to rotate beyond a critical angle, a substantial portion of the wave is momentarily transmitted by the prism. The rotating prism thus permits a relatively slow buildup of a high energy pulse within the laser, followed by its rapid discharge. The laser can be operated in a synchronous mode by synchronizing the rotation of the prism with the internal modulation of the laser, or in a non-synchronous mode.

Figure 1:
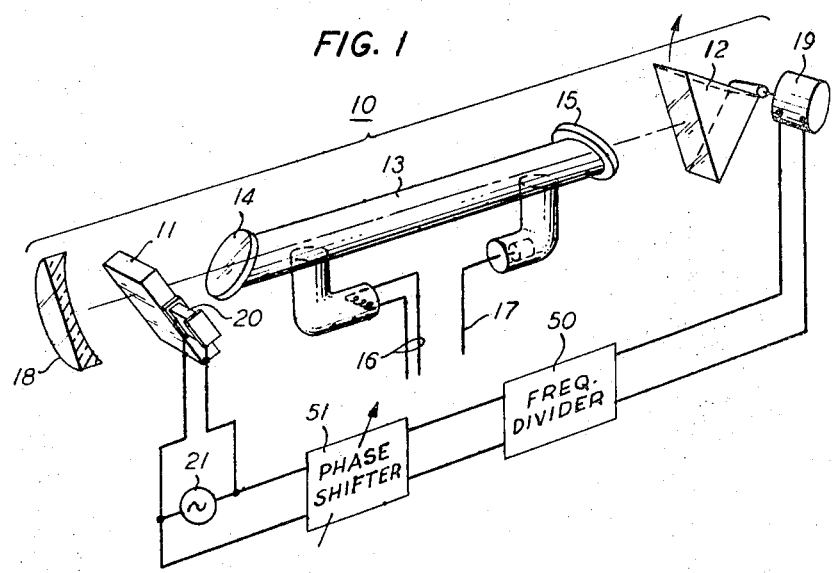
Figure 2:
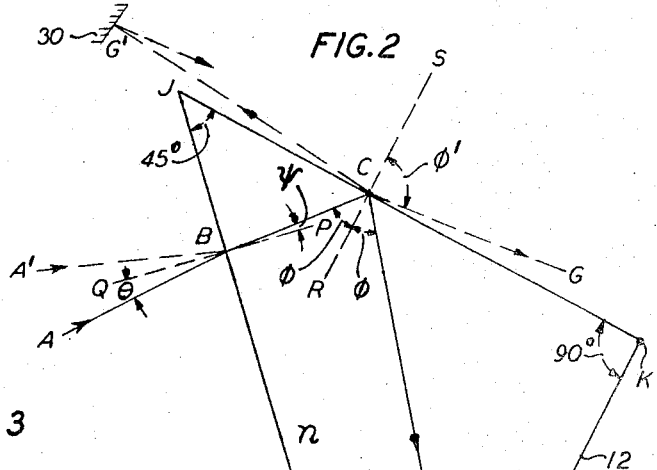
Figure 3:
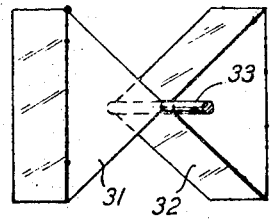
Figure 4:
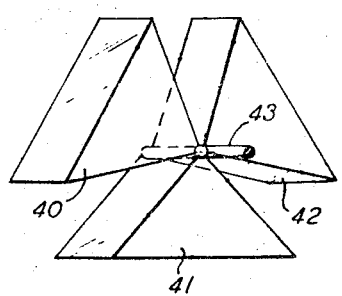

These and other objects and advantages, the nature of the present invention, and its various features, will appear more fully upon consideration of the various illustrative embodiments now to be described in detail in connection with the accompanying drawings, in which:

FIG. 1 shows a laser oscillator, in accordance with the invention, including a rotating prism end member;

FIG. 2, included for purposes of explanation, shows the paths followed by a beam of wave energy within a right angle prism for a particular direction of incidence; and FIGS. 3 and 4 show balanced prism arrangements utilizing two and three prisms, respectively.

Referring to the drawings, FIG. 1 shows an illustrative embodiment of the invention comprising a laser oscillator 10, including intracavity modulating means 11 for synchronously modulating the laser, and means 12 for extracting pulses of energy therefrom. Typically, a laser oscillator comprises an active material disposed within a resonant cavity. In the embodiment of FIG. 1, the active material is a gas enclosed within an elongated tube 13. To minimize reflections, the ends 14 and 15 of tube 13 are inclined at the Brewster angle. A direct current power source (not shown) is connected to electrodes 16 and 17 to supply the power necessary to maintain a gas discharge within tube 13 for the purpose of establishing a population inversion in the energy level system of the active medium. It is to be understood, however, that other means well known in the art can be employed for producing a population inversion in the laser material. (For a more detailed discussion of the gas laser see the article by A. Yariv and J. P. Gordon entitled "The Laser," published in the January 1963 issue of the Proceedings of the Institute of Radio Engineers.)

Tube 13 is located within a resonant cavity defined at one end by a mirror 18 and at the other end by a total reflection prism 12. The commonest device of this type is a prism with two 45 degree angles and one 90 degree angle, the so-called Porro prism. (See "Fundamentals of Optics," by F. A. Jenkins and H. E. White, McGraw-Hill Book Company, Inc., 1957, page 16.) In the embodiment of FIG. 1, prism 12 is free to rotate about an axis whose direction is perpendicular to the axis of the cavity, and which passes through the 90 degree vertex of the prism. The prism is rotated by means of a motor 19.

Located within the cavity, and adjacent to mirror 18, is the modulator 11. The latter can be a fused quartz block tilted so as to have its large area surfaces inclined at the Brewster angle with respect to the direction of propagation of the wave energy. An elastic standing wave is induced in the modulator 11 in a direction transverse to the direction of wave propagation in the laser cavity by means of a transducer 20 mounted on one side of modulator 11, and driven by a modulation signal source 21. For a more detailed discussion of the synchronously modulated laser and the effects produced thereby see the above-identified article by L. E. Hargrove et al., and the copending application, Ser. No. 362,319, filed Apr. 24, 1964. For purposes of the explanation given hereinbelow, it is sufficient to know that the effect produced by synchronously modulating laser 10 is to concentrate the wave energy into a high intensity packet of energy which propagates back and forth within the cavity. It is the purpose of the present invention to extract from the laser cavity a significant portion of this energy in the form of a high intensity pulse.

The operation of the present invention can best be explained by referring to FIG. 2, which shows an enlarged representation of prism 12 adapted to rotate about an axis through the 90 degree vertex K. Also shown is a beam of light AB, incident upon surface JL at an angle of incidence θ. Beam AB is shown to be refracted at the surface JL, reflected at the surface JK, reflected again at the surface KL, and refracted again at the surface JL. The direction of the emergent beam EF is parallel to that of the entrant beam AB. In a right angle prism (angle JKL=90°) the portion of the beam BC within the prism is also parallel to beam portion DE.

If the surface JL is untreated, there is some reflection loss when the beam AB strikes JL, and also when beam DE strikes JL. However, this loss can be kept to about 0.1 percent or less by the application of a suitable antireflection film to surface JL.

Drawing the normals RCS and TDU to the respective prism surfaces and designating angle ABQ as $\theta$, and PBC as $\psi$, we have that $$\frac{\sin \theta}{\sin \psi} = \mu \qquad (1)$$

where $\mu$ is the refractive index of prism 12 relative to the surrounding medium.

The angle $\Phi$ which beam BC makes with the normal RCS to the surface JK is given by $$\Phi = \frac{\pi}{4} - \psi \qquad (2)$$

In general, for small values of $\Phi$, part of beam BC is reflected at surface JK in the direction CD, while the rest of the beam is transmitted through the surface, and refracted in the direction CG. Designating angle SCG as $\Phi'$, angles $\Phi$ and $\Phi'$ are related by $$\frac{\sin \Phi'}{\sin \Phi} = \mu \qquad (3)$$

The critical angle $\Phi_{crit}$, for which $\sin \Phi' = 1$, is given by $$\sin \Phi_{crit.} = \frac{1}{\mu} \qquad (4)$$

and represents the maximum angle of incidence of beam BC for which transmission occurs. For values of $\Phi$ greater than $\Phi_{crit}$, beam BC is totally reflected at surface JK and, therefore, none of the beam is refracted out of prism 12. That is, the reflection coefficient at surface JK for $\Phi > \Phi_{crit}$ is 100 percent.

If it is assumed, for purposes of illustration, that $\mu$ is greater than $\sqrt{2}$, then it follows from (4) that $$\Phi_{crit.} < \frac{\pi}{4}$$

and that total internal reflection occurs at surface JK for all values of $\Phi$ given by $$\Phi_{crit.} \leq \Phi \leq \frac{\pi}{4} \qquad (5)$$

The Equations 2 and 5, it further follows that $$\Phi_{crit.} \leq \left(\frac{\pi}{4} - \psi\right) \leq \frac{\pi}{4}$$

or $$\left(\frac{\pi}{4} - \Phi_{crit.}\right) \geq \psi \geq 0 \qquad (6)$$

Designating $$\left(\frac{\pi}{4} - \Phi_{crit.}\right)$$

as $\rho$, Equation 6 can be rewritten as $$\rho \geq \psi \geq 0 \qquad (7)$$

If the angle CDT is designated $\Omega$, then $$\Omega = \frac{\pi}{4} + \psi$$

and $\Omega > \Phi_{crit}$ for positive values of $\psi$. Consequently there is also total internal reflection at surface LK.

The derivation given above is equally applicable for negative values of $\psi$ and $\theta$. This is equivalent to a beam incident along a direction A'B. Thus, to summarize, prism 12 behaves as a 100 percent retroreflector for values of $\psi$ given by $$-\rho \leq \psi_{100} \leq +\rho \qquad (8)$$

If, on the other hand $|\psi| > \rho$, some light is refracted out of prism 12 at points C or D.

Assuming a zero absorption coefficient for the prism, we can define a reflection coefficient R as the ratio of the intensity of the beam reflected in the direction CD to the intensity of the incident beam BC. It is to be noted that both the incident and the reflected beams are traveling in a medium of refractive index $\mu$, and have equal cross sections. The transmission coefficient T is defined as 1−R, and is a measure of the power refracted out of the prism. To obtain the intensity of the refracted beam, however, account must also be taken of the relative change of cross-sectional area of the beam.

If, for example, the beam AB is plane polarized in a direction that is parallel to the axis of rotation through K, the transmission coefficient $T_a$ is given by $$T_a = 1 - R_a = 1 - \left[\frac{\sin(\Phi' - \Phi)}{\sin(\Phi' + \Phi)}\right]^2 \qquad (9)$$

where $\sin \Phi' = \mu \sin \Phi$.

If the direction of polarization of beam AB is normal to the axis of rotation, the transmission coefficient $T_p$ is given by $$T_p = 1 - R_p = 1 - \left[\frac{\tan \Phi' - \Phi}{\tan \Phi' - \Phi}\right]^2 \qquad (10)$$

A plot of the transmission coefficient in the vicinity of $\Phi_{crit}$ discloses that the mean slope of the curve is steeper for the direction of polarization for which Equation 10 applies than for that for which Equation 9 applies. It would obviously be desirable, therefore, to select the direction of polarization of beam AB for which the slope is greater.

The change in $\Phi$ that is required to give some specific value of transmission coefficient was also plotted as a function of the refractive index of the material. These plots indicate that the material should have as high a refractive index as can conveniently be obtained. However, the improvement in performance with increased $\mu$ is not very large so that this requirement is not a stringent one. For example, the improvement is only about 1.5 times if $\mu$ increases from 1.5 to 1.8. Typically, most materials that would be used for the prism lie within this range. These include, for example, a typical flint glass (1.65), fused quarts (1.48) and sapphire (1.7). For special application, diamond, which has a very high refractive index (2.42) might be used.

In addition to the proper refractive index, the prism material should be optically homogeneous, have a high strength to weight ratio, and have a low coefficient of absorption.

For purposes of illustration, let us consider a specific example using a material having a refractive index of 1.6. For this material, $$\Phi_{crit} = \arcsin\left(\frac{1}{\mu}\right) \approx 38.7°$$

and hence $$\rho = \frac{\pi}{4} - \Phi_{crit} = 6.3°$$

From Equation 8

$$-6.3° \leq \psi_{100} \leq 6.3°$$

From Equation 1

$$\sin \theta = \mu \sin \psi$$

and, therefore $-10° \leq \theta_{100} \leq +10°$.

That is, prism 12 can be rotated through an angle of 20 degrees (from $\theta = -10°$ to $\theta = +10°$) and still display over this entire period a reflection coefficient of 100 percent. However, a very small additional rotation, sufficient to make $\Phi$ decrease very slightly below $\Phi_{crit}$, substantially reduces the reflection coefficient and correspondingly increases the transmission coefficient such that a significant fraction of the energy in beam AB is emitted in the direction CG. In particular, a plot of Equation 10 shows that 25 percent of the energy in beam AB is transmitted in the direction CG if $\Phi$ is decreased below $\Phi_{crit}$ by as little as 0.03 degree. This corresponds to an angular displacement of the prism of the order of $\mu$ times 0.03 degree or 0.05 degree.

In terms of the operation of the laser of FIG. 1, the prism in the $\theta=0$ position is totally reflecting and together prism 12 and mirror 18 define a laser cavity. If now the prism is rotated through an angle $\theta$ less than 10 degrees, it continues to act as a 100 percent reflector. However, as the prism is rotated through the next small increment, $\Delta\theta=0.05°$, the reflection coefficient drops to 75 percent and 25 percent of the beam is transmitted out of the laser cavity.

A typical prism 5 mm. along each side $$(JK=KL=5 \text{ mm.})$$

can be readily rotated by an air turbine at about 10000 r.p.s. At this speed the time taken to rotate through 20 degrees ($\theta=-10°$ to $\theta=+10°$) is about 5 microseconds, and represents the total time during which the prism appears to the laser as a high quality mirror. This is typically 150 times the round trip travel time for a pulse of light in a 5 meter laser, and is sufficient time for the pulse to build up to full strength. The time taken to rotate through 0.05 degree is about 15 nanoseconds. As this time is less than the round trip time (35 nanoseconds) of the pulse, the latter can be totally reflected by the prism one time, but only 75 percent reflected the next time around.

It will be noted that when used as one of the end reflectors in the embodiment of FIG. 1, light is incident upon a substantial portion of surface JL. This means that while some of the light travels in the direction ABCDEF, the rest of the incident light travels in the reverse direction FEDCBA. This means that when light is transmitted in the direction CG, other light escapes in the direction CG'. To avoid losing this latter energy, a stationary mirror 30 is located so as to intercept and reflect beam CG' so that it adds to the beam traveling in the direction CG.

The pulse duration for an intracavity modulated laser is about one nanosecond. During this interval, the prism rotates about 0.003 degree. This results in a change in the direction of output beam CG that is given by (0.003) $d\Phi'/d\Phi$. For the illustrative example given above, $d\Phi'/d\Phi$ is approximately equal to 50, resulting in a small additional divergence in the output beam of about one to two tenths of a degree. Also in the illustrative example, 25 percent of the intracavity pulse energy was extracted. Since the amount of light extracted is a function of $\Delta\theta$, it can be increased up to about 85 percent by either increasing the angular velocity of the prism or by lengthening the laser cavity. Either of these expedients has the effect of permitting the prism to rotate through a greater angle in the interval of time it takes the intracavity wave energy to make one round trip. It should be noted, however, that even a 25 percent extraction is substantially greater than can be obtained through an end mirror that typically has a transmission coefficient that is of the order of one percent or less.

It is apparent that in order to rotate prism 12 at high speeds it is highly desirable to provide a counterweight to balance the prism structure. This can be readily done by using two prisms 31 and 32 which share a common 90 degree vertex, and which are displaced 180 degrees relative to each other, as illustrated in FIG. 3. The prisms rotate about a shaft 33 located at their common vertex.

FIG. 4 is an alternative arrangement of a balanced prism structure using three prisms 40, 41 and 42 which share a common 90 degree vertex and which are displaced 120 degrees relative to each other. The prisms are similarly rotated about a shaft 43 through their common vertex.

For simple applications where only a single pulse is required, or where the pulse repetition rate is unimportant, there is no need to synchronize the rotation of the prism with the modulation produced by the intracavity modulator 11. If, however, a regular sequence of large pulses is required (i.e., one pulse per revolution per prism), it would be necessary to provide suitable synchronization. This can be done by dividing the frequency of the signal derived from the signal modulation source 21 in a frequency divider 50, which can be any ordinary counter, and using the output of the divider to power motor 19. The motor can be of the type used by J. W. Beams, and illustrated in the Journal of the Washington Academy of Science, 37, 221, 1947, in which case the output from frequency divider 50 is used to drive a two phase rotating magnetic field system. The prism, in such an arrangement, is fixed to a block of iron which is suspended magnetically and driven by the rotating field. An adjustable phase shifter 51 can also be included to make fine synchronization adjustments.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. An optical pulse generator comprising:
   a laser oscillator including a region of active laser material disposed within a resonant cavity bounded by a pair of axially spaced reflectors;
   one of said reflectors being a totally reflecting mirror;
   the other of said reflectors including a 90 degree, retroreflecting prism rotating about an axis parallel to its vertices;
   characterized in that substantially all of the intracavity wave energy incident upon said rotating prism is reflected by said prism over a range of directions of incidence; and
   in that a significant portion of the intracavity wave energy incident upon said rotating prism is coupled out of said cavity through said prism for other directions of incidence.
2. The generator according to claim 1 wherein said prism structure comprises two 90 degree prisms sharing a common 90 degree vertex and symmetrically displaced 180 degrees relative to each other; and
   wherein said prisms are adapted to rotate about said common vertex.
3. The generator according to claim 1 wherein said prism structure comprises three 90 degree prisms sharing a common 90 degree vertex and symmetrically displaced 120 degrees relative to each other; and
   wherein said prisms are adapted to rotate about said common vertex.
4. The generator according to claim 1 including intracavity means for synchronously modulating said oscillator.

References Cited
UNITED STATES PATENTS

| 2,506,764 | 5/1950 | Bach | 88—1.5 |
| 3,410,641 | 11/1968 | Bergman | 331—94.5 |
| 3,395,961 | 8/1968 | Ready | 331—94.5 |

OTHER REFERENCES

Hargrove et al., Locking of He-Ne Laser Modes Induced by Synchronous Intracavity Modulation. Applied Physics Letters, vol. 5, No. 1 (July 1964) pp. 4 and 5.

RONALD L. WIBERT, Primary Examiner

W. L. SIKES, Assistant Examiner

U.S. Cl. X.R.

350—7, 168, 286